United States Patent [19]

Campbell et al.

[11] Patent Number: 5,126,677
[45] Date of Patent: Jun. 30, 1992

[54] APPARATUS AND METHOD FOR PREVENTING SPURIOUS SIGNALS TO THE RADIO FREQUENCY MONITOR USED FOR EARLY WARNING OF IMPENDING FAILURE IN ELECTRIC GENERATORS AND OTHER EQUIPMENT

[75] Inventors: Steven R. Campbell, Toronto; Gregory C. Stone, Islington, both of Canada

[73] Assignee: Electric Power Research Institute, Inc., Palo Alto, Calif.

[21] Appl. No.: 566,988

[22] Filed: Aug. 14, 1990

[51] Int. Cl.[5] .............................................. G01R 31/34
[52] U.S. Cl. .................................. 324/511; 324/532; 324/545; 324/546
[58] Field of Search ............... 324/536, 532, 535, 546, 324/547, 511, 545

[56] References Cited

U.S. PATENT DOCUMENTS

| | | | |
|---|---|---|---|
| 3,462,681 | 8/1969 | Biskup | 324/535 |
| 3,505,597 | 4/1970 | Cronin et al. | 324/536 X |
| 3,609,533 | 9/1971 | Pardis | 324/535 |
| 4,095,173 | 6/1978 | Darrel | 324/535 |
| 4,156,846 | 5/1979 | Harrold et al. | 324/546 X |
| 4,158,169 | 6/1979 | Harrold et al. | 324/547 X |
| 4,191,921 | 3/1980 | Yoshino | 324/547 |
| 4,356,443 | 10/1982 | Emery | 324/546 |
| 4,771,355 | 9/1988 | Emery et al. | 324/546 X |
| 4,814,699 | 3/1989 | Koziel et al. | 324/511 X |
| 4,853,818 | 8/1989 | Emery et al. | 324/546 X |
| 4,897,607 | 1/1990 | Grünewald et al. | 324/546 X |

Primary Examiner—Kenneth A. Wieder
Attorney, Agent, or Firm—Leonard Bloom

[57] ABSTRACT

An apparatus for the deletion of extraneous signals to a radio frequency monitor is described having a first radio frequency sensor disposed at the neutral common ground of a dynamoelectric machine and delivering radio frequency signals from all sources to a switch at the input of a radio frequency monitor and further having auxiliary radio frequency sensors disposed at sources of normal radio frequency activity and providing signals of such normal activity to a deletion pulse generator which issues a blocking pulse to said switch thereby deleting RF noise from normal sources which otherwise may produce false warnings and restrict the diagnostic utility of radio frequency monitoring of an electric power generator or an electric motor.

67 Claims, 8 Drawing Sheets

APPARATUS AND METHOD FOR PREVENTING SPURIOUS SIGNALS TO THE RADIO FREQUENCY MONITOR USED FOR EARLY WARNING OF IMPENDING FAILURE IN ELECTRIC GENERATORS AND OTHER EQUIPMENT

FIELD OF THE INVENTION

The present invention relates to radio frequency monitoring of turbine-generators, electric power equipment, networks and related apparatus to provide an early warning of an impending failure, and more particularly, to a system and method for detecting and filtering out spurious signals that may trigger a false alarm.

BACKGROUND OF THE INVENTION

High level electrical discharges or arcs within a dynamoelectric machine produce radio frequency (RF) emissions which provide operators with a warning of impending failure when properly detected. The sources of such electrical activity include: (1) broken conductors in the rotor or stator windings, (2) intermittent strand or turn shorts in the rotor or stator winding and (3) occurrences of severe slot discharges. Various monitor devices and systems have been previously described.

U.S. Pat. No. 3,813,160 issued to Cronin et al, Aug. 20, 1974, discloses a monitoring system for detecting continuous voltages and currents on a rotating shaft. The current is measured by measuring the voltage drop across a shunt while the voltage is directly measured. When predetermined levels for either voltage or current are exceeded, an alarm sounds.

Sawada et al in U.S. Pat. No. 4,058,804 issued Nov. 15, 1977, disclose a signal monitoring system for monitoring generator slip ring brushes. Radio frequency emission from the slip ring brushes is detected and recurring noise signals are subtracted. The circuit actuates an alarm if the RF signal from the brushes exceeds a predetermined value.

U.S. Pat. No. 4,502,046 issued Feb. 26, 1985 to Wonn et al disclose a detection system for rubs between the rotating and stationary parts of a turbine by connecting the rotor to electrical ground and introducing electrical energy into the rotor grounding circuit. A rub between the rotor and the stationary part modifies the currents in the ground circuit to an extent which actuates an alarm. In another embodiment of patent '046, the rotor discharge current in one or more grounding devices normally associated with a turbine is monitored to detect any abnormal conditions.

Radio frequency (RF) emissions are readily detected by an RF monitor, and the diagnostic importance of radio frequency emission from power generators was reported by F. T. Emery and R. T. Harrold in an article entitled "On Line Incipent Arc Detection in Large Turbine Generator Stator Windings", IEEE Transactions on Power Apparatus and Systems, Vol. PAS-99, p. 2232, November/December, (1980). In field use reported here, the RF signals were detected by a high frequency current transformer which was coupled to the neutral ground connection of the generator.

U.S. Pat. No. 4,853,818 issued to Emery et al on Aug. 1, 1989, and assigned to the assignee of this application disclose the RF monitoring of a dynamoelectric machine by coupling a sensor to the neutral common ground. The output from a capacitive sensor is provided to an RF monitor for analysis and diagnostic use in the maintenance of the generator. The RF monitor does not distinguish between signals which are warnings of impending breakdown and signals which are routine emissions from one of several sources in the dynamoelectric machine. Such sources include (1) d.c. field slip rings, (2) shaft grounding brush and (3) isolated phase bus. The RF emissions from the normal sources produces false alarms at the RF monitor and thus seriously detract from the reliability and acceptability of the radio frequency monitor as a warning system.

SUMMARY OF THE INVENTION

Accordingly, it is an object of the present invention to provide an apparatus and a method for detecting and filtering out spurious or unwanted signals, which would trigger false alarms, thereby improving the reliability of the radio frequency (RF) monitor as an early warning system.

Another object of the present invention is to provide a system and a method for locating the source of a severe disturbance in an electrical apparatus or network by detecting the associated radio frequency emission. In an electric power generator, such sources include slip rings, shaft ground brush or isolated phase bus. If the severity of the disturbance from any source persists or becomes extreme, certain maintenance decisions can be made to repair the source. The present invention provides for a warning when the electrical activity of a normal source is excessive, either in strength or duration.

Radio frequency monitoring provides useful diagnostic information about any electrical system where arcing and electrical discharge can occur. In addition to electrodynamic machines, embodiments of the present invention include electric power distribution networks, electric power substations and the like. In all of the embodiments, at least two radio frequency sensors are disposed on the electrical apparatus or network to be monitored. The strength of the signals from each sensor substantially depends on the source-to-sensor distance, whereby measurement of signals from all the sensors in time coincidence provides information on the occurrence and origin of RF radiation.

It is a further object of the present invention to provide an apparatus which is reliable, easy to install and to maintain, and cost effective.

In one embodiment of the present invention, at least two radio frequency sensors are disposed on electrical apparatus, at different positions, an adjustable delay line is provided for each sensor and the delay line output is in time coincidence with the other delay line outputs. A comparator is provided for each sensor and the comparator receives the signal from the delay line, compares the signal with predetermined normal level, produces a comparator signal if the sensor signal exceeds the normal level, and delivers the sensor signal and comparator signal, if activated, to an output. A recorder and timer are provided. The recorder collects the output of the respective comparators and the timer. A display is provided for the presentation of the results. The onset of an excessive RF signal marks the occurrence of a severe electrical disturbance. The relative changes in the signals strengths of the different sensors locates the origin of the disturbance with the strongest signal from the sensor nearest the disturbance. The precision with which the location is determined depends on the number and disposition of the RF sensors.

In accordance with the teachings of the present invention, there is herein and described, a system for sensing diagnostic RF signals from a dynamoelectric machine, having a RF monitor and further having a neutral ground connection. In the analog electronics embodiment, a diagnostic first sensor, having an output, is coupled to the neutral ground connection of the machine. A delay line is provided and connected to the output of the first sensor. An analog switch is provided and the delay line output is connected to the analog switch having a gate control and an output connected to the RF monitor. When the analog switch is opened by a gate control signal, the analog switch interrupts communication between the diagnostic first sensor and the RF monitor, deleting a time segment of the first sensor signal to the RF monitor for the duration of the deletion pulse input to the gate control. Said delay line determines the beginning of the deletion time segment. At least one additional radio frequency sensor is positioned at a source of spurious RF emanations associated with at least one of the slip rings, shaft grounding brush, and isolated phase power output buses. A trigger level generator with adjustment means is provided for each additional sensor and means are provided for comparing the signal from the additional sensor with the adjusted trigger level, thereby providing an acceptable trigger signal. A deletion pulse generator is provided having an input connected to the trigger signal means, an output connected to the gate control of the analog switch and means of adjusting the duration of the output deletion pulse. When more than one additional auxiliary sensor is provided, an OR gate is also provided, and the outputs of the several deletion pulse generators are connected to the input ports of the OR gate. The output of the OR gate is connected to the control gate of the analog switch. As a result, the signal to the RF monitor is deleted when spurious radio frequency activity is detected by at least one of the additional sensors.

In a digital electronics embodiment of the present invention, digital electronics are provided for the diagnostic RF signal from a dynamoelectric electric machine. The embodiment comprises an RF monitor and a neutral ground connection to the machine. A diagnostic first sensor, having an output, is coupled to the neutral ground connection of the machine. An analog-to-digital converter (ADC), a delay line, a digital switch and a digital-to-analog converter (DAC) are provided. The ADC input is connected to the output of the first sensor and the ADC output is connected to the delay line. The delay line output is connected to the digital switch having a gate control, an input and an output. The output of the digital switch is connected to the input of the DAC. The DAC output is connected to the input of a conventional RF monitor which accepts analog signals only. Where the RF monitor is designed to accept digital signals, the DAC is omitted. When the digital switch is opened by a gate control signal, the digital switch interrupts communication between the first sensor and the RF monitor, deleting a time segment of the first sensor signal to the RF monitor for the duration of the deletion pulse to the gate control. The delay line determines the beginning of said deletion time. At least one additional radio frequency sensor is positioned at a source of spurious RF emanations associated with at least one of the slip rings, shaft grounding brush, and isolated phase power buses. A trigger level generator with adjustment means is provided for this additional sensor and means are provided for comparing the signal from the additional sensor with the adjusted trigger level, thereby providing an acceptable trigger signal. A deletion pulse generator is provided having an input connected to the trigger signal means, an output connected to the gate control of the digital switch and means of adjusting the duration of the output deletion pulse. When more than one additional auxiliary sensor is provided, an OR gate is also provided, and the outputs of the several deletion pulse generators are connected to the input ports of the OR gate. The output of the OR gate is connected to the control gate of the digital switch. As a result, the signal to the RF monitor is deleted when spurious radio activity is detected by at least one of the additional sensors.

The dynamoelectric machines in the embodiments of this invention include both electric power generators and electric motors. The sensors for the RF emanations in the embodiments of this invention are high frequency current transformers, high frequency capacitors or any antenna devices capable of detecting RF signals. The invention further includes a portable spurious RF sensor flexibly connected to the analog or digital switch at the input to the RF monitor so that the portable RF sensor may be positioned at new RF sources to assess their strengths.

Viewed in another aspect, the present invention further provides a method for sensing diagnostic radio frequency (RF) signals from a dynamoelectric machine and for precluding spurious RF signals that may trigger a false alarm. This method includes the steps of providing an RF sensor coupled to the neutral ground and of detecting RF signals at the neutral ground connection of the machine. A delay line is provided for receiving the RF signals at the neutral ground connection and a switch having an input is provided for communicating the RF signals. This switch further has a control gate and an output. An RF monitor is provided and the output of the switch is connected to the input of the RF monitor. Spurious radio frequency signals are detected by an auxiliary sensor or sensors provided at (at least) one location on the machine other than the neutral ground connection. A comparator is provided each auxiliary sensor and spurious RF signals are compared with predetermined standards to assure recognition of signals from a normal noise source. A deletion pulse generator is provided having an input connection to said comparator output, a means of adjusting the duration of an output deletion pulse, and an output through an OR gate to the switch control gate, thereby fictitious warning signals to the RF monitor are deleted, and the reliability of the radio frequency monitor as a warning device is increased.

One of the physical relationships involved in the diagnostic method and system provided by the present invention is the dependence of sensor signal strength on the source-to-sensor distance. An auxiliary sensor placed close to a significant noise source produces a very strong signal, and the signal strength increases as the separation between source and sensor decreases. An auxiliary sensor placed close to a significant noise source produces a clear strong signal which will reliably operate the signal deletion switch at the RF monitor input.

Another feature of the present invention is a consequence of the relationship between sensor signal strength and source-to-sensor separation. In an embodiment of this feature, means of comparing the signal strength from the neutral ground sensor with the signal strength from one or more auxiliary sensors are provided. When the neutral ground sensor signal is stronger than the signal from any one of the auxiliary sensors, the comparator output opens a second switch disposed in the line between the deletion pulse generator(s) and the control gate of the switch at the RF monitor input thereby blocking the deletion pulse and maintaining communication between the neutral ground sensor and the RF monitor.

These and other objects of the present invention will become apparent from a reading of the following specification, taken in conjunction with the enclosed drawings.

DESCRIPTION OF THE PREFERRED EMBODIMENTS

Figure 1:
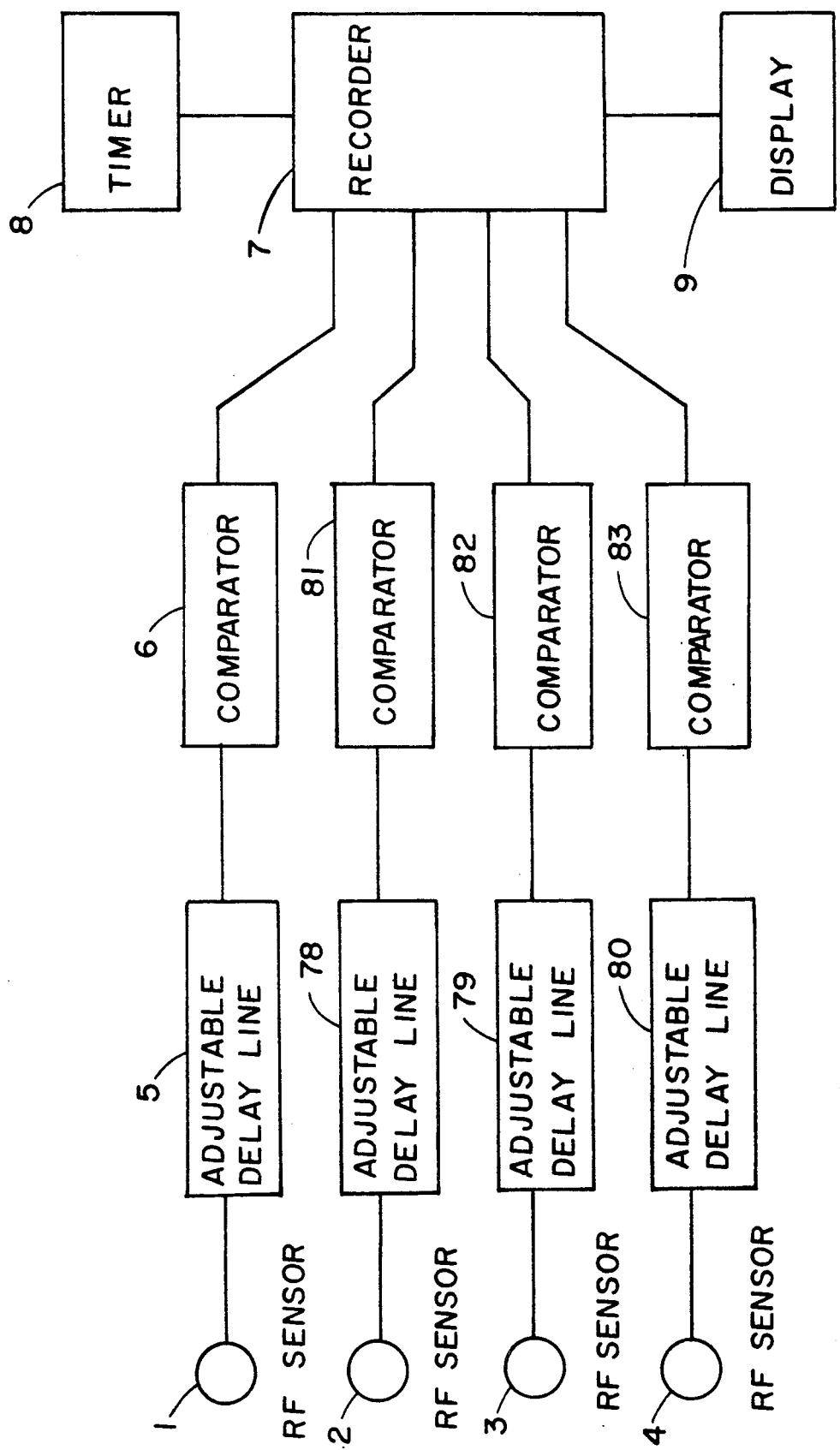
FIG. 1 is a schematic block diagram of an embodiment of the present invention showing four radio frequency (RF) sensors disposed on an electrical apparatus at different locations, an adjustable delay line for each so that the respective signals may be compared in time coincidence, and a comparator for each sensor which detects abnormal values of sensor signal strength. An increase in signal strength from one or more RF sensors results when an electrical disturbance occurs. Disturbance location information is provided by the relative increase in signal strengths from the various sensors because of the substantial dependence of the sensor signal strength on the source-to-sensor distance.

Referring to FIG. 1, the present invention teaches that the substantial dependence of radio frequency (RF) signal strength on source-to-sensor distance in each sensor in a plurality of sensors disposed on an electrical apparatus at different locations provides information on the occurrence and locations of RF sources when signals from the plurality of sensors are compared in time coincidence. RF sensors 1–4 are disposed at different locations on the electrical apparatus to be monitored. The output of sensor 1 passes through an adjustable delay line 5 which brings the output into time coincidence with the outputs of the other sensors 2–4. The comparator 6 detects a sensor signal strength in excess of a predetermined normal value and the comparator signal along with the sensor signal are collected in recorder 7 in chronological order determined by timer 8. A display 9 is provided to present sensor signal 1–4 records and comparator 6, 81–83 outputs. An electrical disturbance which may portend a failure will be detected by an increase in the signal strength from one or more sensors. The location of the disturbance will be given, at least approximately, by the locations of the sensor or sensors with the largest signal increase(s).

Figure 2:
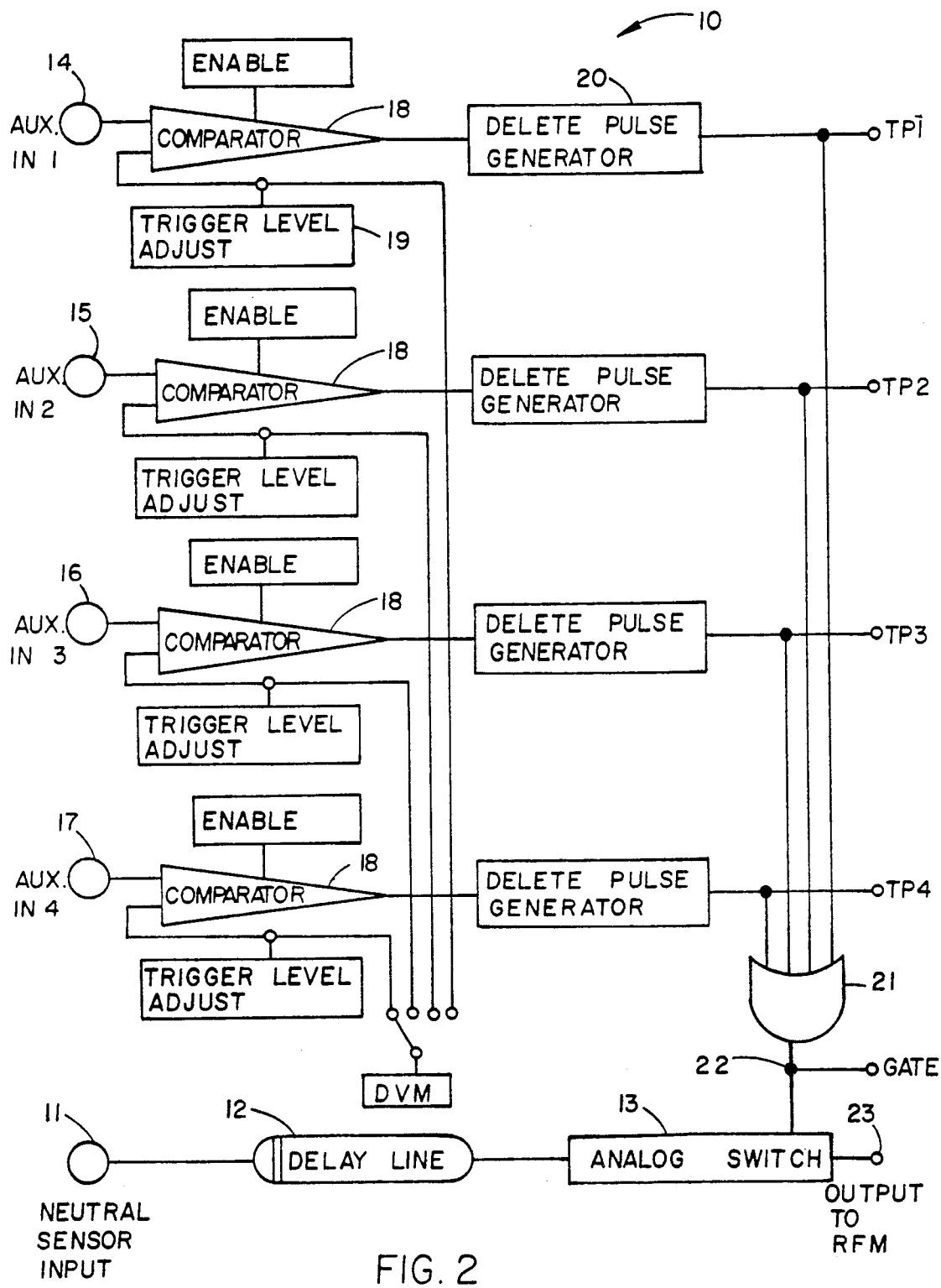
FIG. 2 is a schematic block diagram of an embodiment of the invention showing the neutral ground sensor input to the analog switch through a delay line, and four auxiliary sensor connections wherein each input from four auxiliary sensors is compared with a threshold trigger level and passed if larger to a delete pulse generator which determines the duration of a deletion pulse to the analog switch gate.

Referring to FIG. 2 which shows a block diagram of an embodiment 10 of the present invention in a dynamoelectric machine, output from sensor 11 coupled to the neutral ground is conducted through delay line 12 to the analog switch 13. Signals of diagnostic value as well as RF noise due to normal operation are delivered to the analog switch 13. The present invention provides the apparatus 10 and method for the deletion of RF signals of little diagnostic value. Auxiliary RF sensors are positioned at sources of normal radio frequency noise caused by routine arcing and sparking, and the outputs of four auxiliary sensors 14–17 are shown in FIG. 2. A comparator 18 receives the signal from each auxiliary sensor and transmits it if it is larger than the threshold set by the trigger level adjust 19. The output from the comparator 18 initiates a delete pulse of adjustable duration in the delete pulse generator 20. The delete pulse generator output and similar outputs from the other sources of RF noise are collected at an OR gate 21 and delivered to the gate 22 of the analog switch 13 thereby blocking spurious RF noise from the output 23 which provides the input to the RF monitor.

Figure 3:
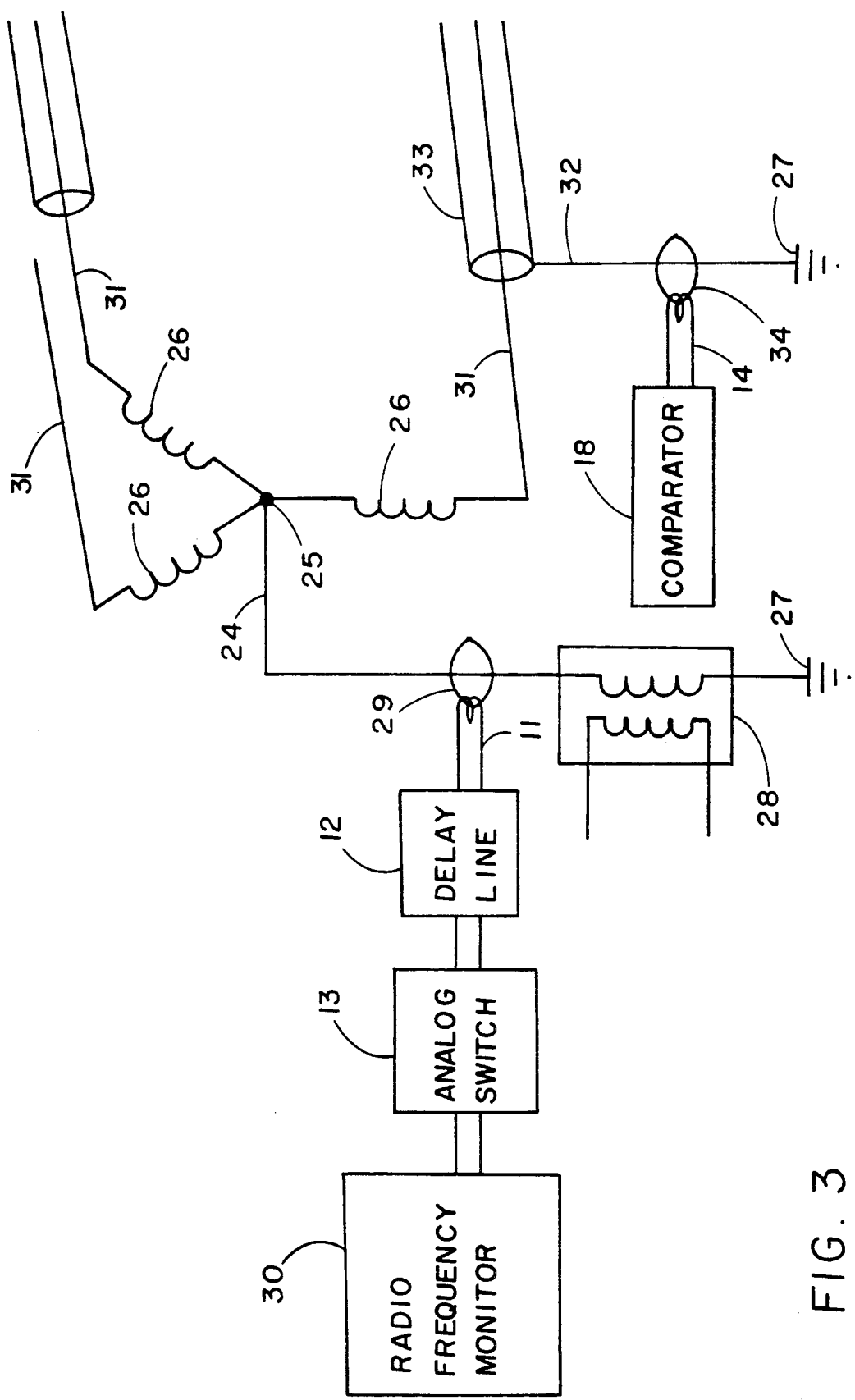
FIG. 3 is a schematic block diagram showing the neutral common ground connection, the stator windings and an isolated phase bus. A high frequency current transformer is the sensor coupled to the common ground connection and its output is delivered to the radio frequency monitor through a delay line and an analog switch. The analog switch receives deletion signals from auxiliary radio frequency sensors. One auxiliary radio frequency sensor is schematically shown on the ground lead to the shield of an isolated phase bus.

Referring to FIG. 3, the neutral ground conductor 24 connects the common junction 25 of the stator phase windings 26 to ground 27 through transformer 28. Radio frequency signals in the common neutral ground 24 are detected by a high frequency current transformer 29 or other suitable RF sensor. The output from the high frequency current transformer 29 is conducted through delay line 12 to the analog switch 13 as described in FIG. 2. When the analog switch 13 is closed, the signals are delivered to an RF monitor 30. FIG. 3 illustrates one source of spurious RF noise due to discharges involving an isolated phase bus 31. The ground connection 32 to the shield 33 (or mounts) of the isolated phase bus is coupled by a high frequency current transformer 34 (or other RF sensor) and the output from the sensor 34 is connected 14 to a comparator 18 as shown in FIG. 2.

Figure 4:
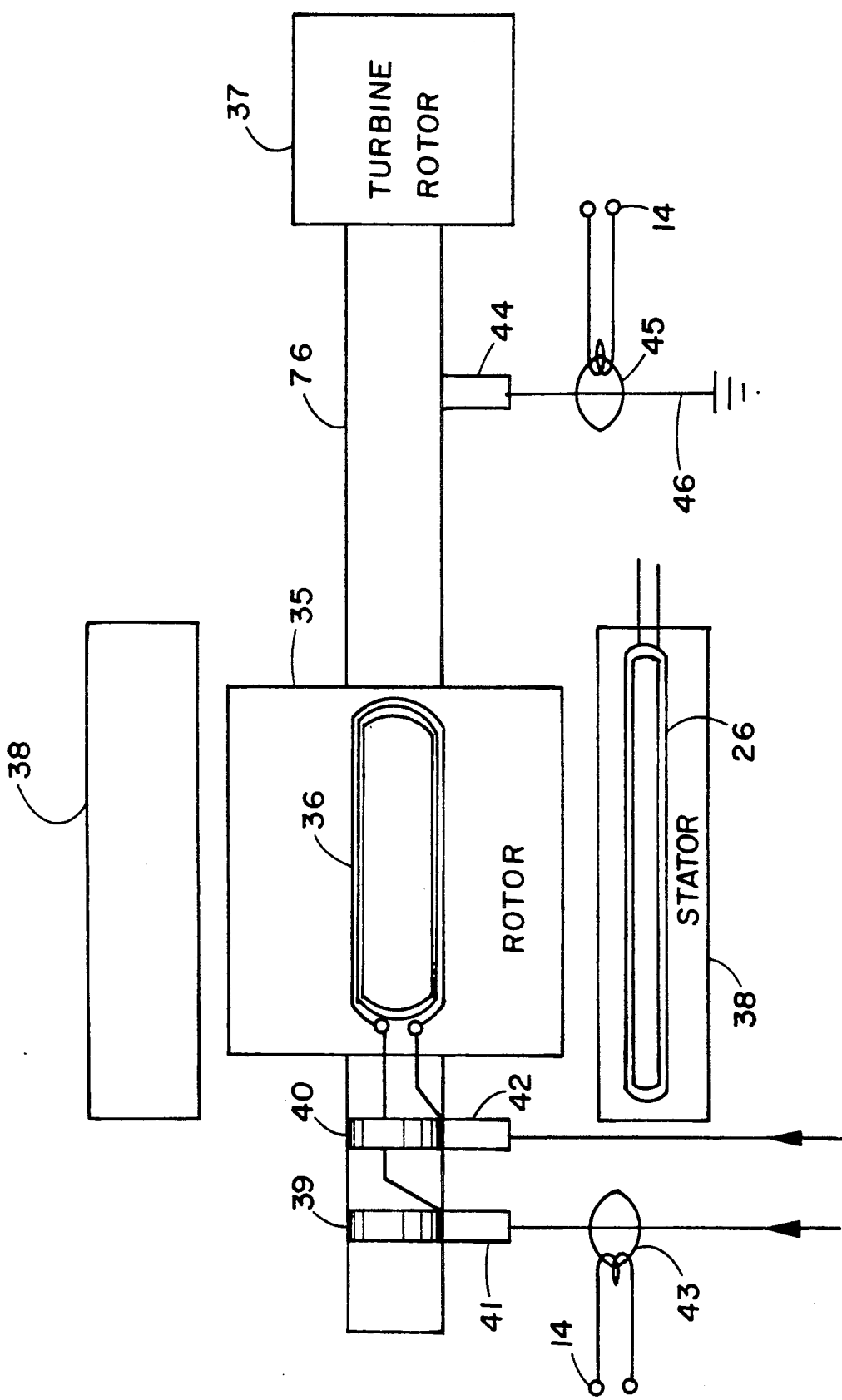
FIG. 4 is a schematic block diagram of the embodiment of the invention in a power generator, showing a first spurious RF source at the pair of slip rings for the d.c. windings and a second spurious source at the shaft grounding brush.

Referring to FIG. 4, the schematic diagram of the embodiment of the present invention in a power generator, a rotor 35 with d.c. windings 36 is mounted on a shaft connected to a turbine 37. Enclosing the rotor is the stator 38 which carries the stator windings 26. One source of spurious radio frequency noise is the pair of slip rings 39 and 40 which ar in sliding contact with their respective brushes 41 and 42. Radio frequency noise generated by arcing at the slip ring brushes is detected by a high frequency current transformer 43 (or other RF sensor) coupled to the brush lead. The output of the radio frequency sensor is delivered to one of the inputs 14–17 of respective comparators as shown in FIG. 2. Another source of radio frequency noise associated with the rotor is generated by the shaft grounding brush 44. This source of spurious radio frequency noise is detected by a high frequency current transformer 45 coupled to the ground lead 46 for the shaft grounding brush. The output from the high frequency current transformer sensor is delivered to one of the inputs 14–17 shown in FIG. 2.

Figure 5:
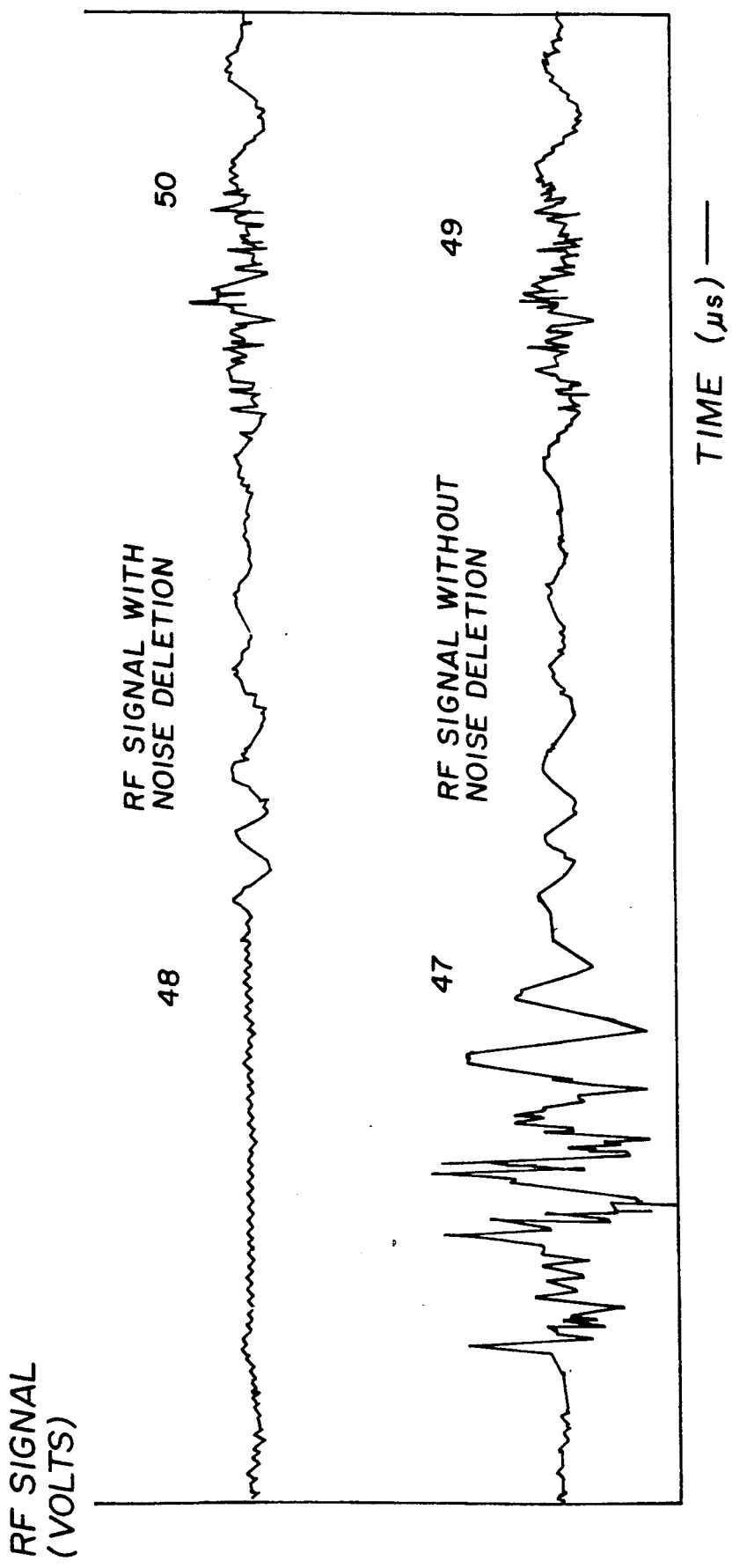
FIG. 5 is two digital oscilloscope plots of radio frequency noise versus time which illustrate the deletion of a spurious radio frequency signal as taught by this invention, wherein the lower trace is the radio frequency signal delivered to the analog switch, and wherein the upper trace is the output from the analog switch after direction of the spurious radio frequency noise from a static exciter.

Referring to FIG. 5, the performance of an embodiment of the invention is illustrated by comparison of the two digital oscilloscope traces 47 and 48. The lower trace 47 is the output from the neutral common ground connection delivered to the analog switch 13 of FIG. 2. The electrical activity 47 is due to static exciter noise which by the present invention is detected by an auxiliary sensor, blocked at the analog switch and deleted from the signal trace 48 delivered to the radio frequency monitor. Bonafide signals for diagnostic analysis 49 are received by the analog switch (13 in FIG. 2) and are transmitted as outgoing trace 50 of the signal delivered (via 23 of FIG. 2) to the radio frequency monitor.

Figure 6:
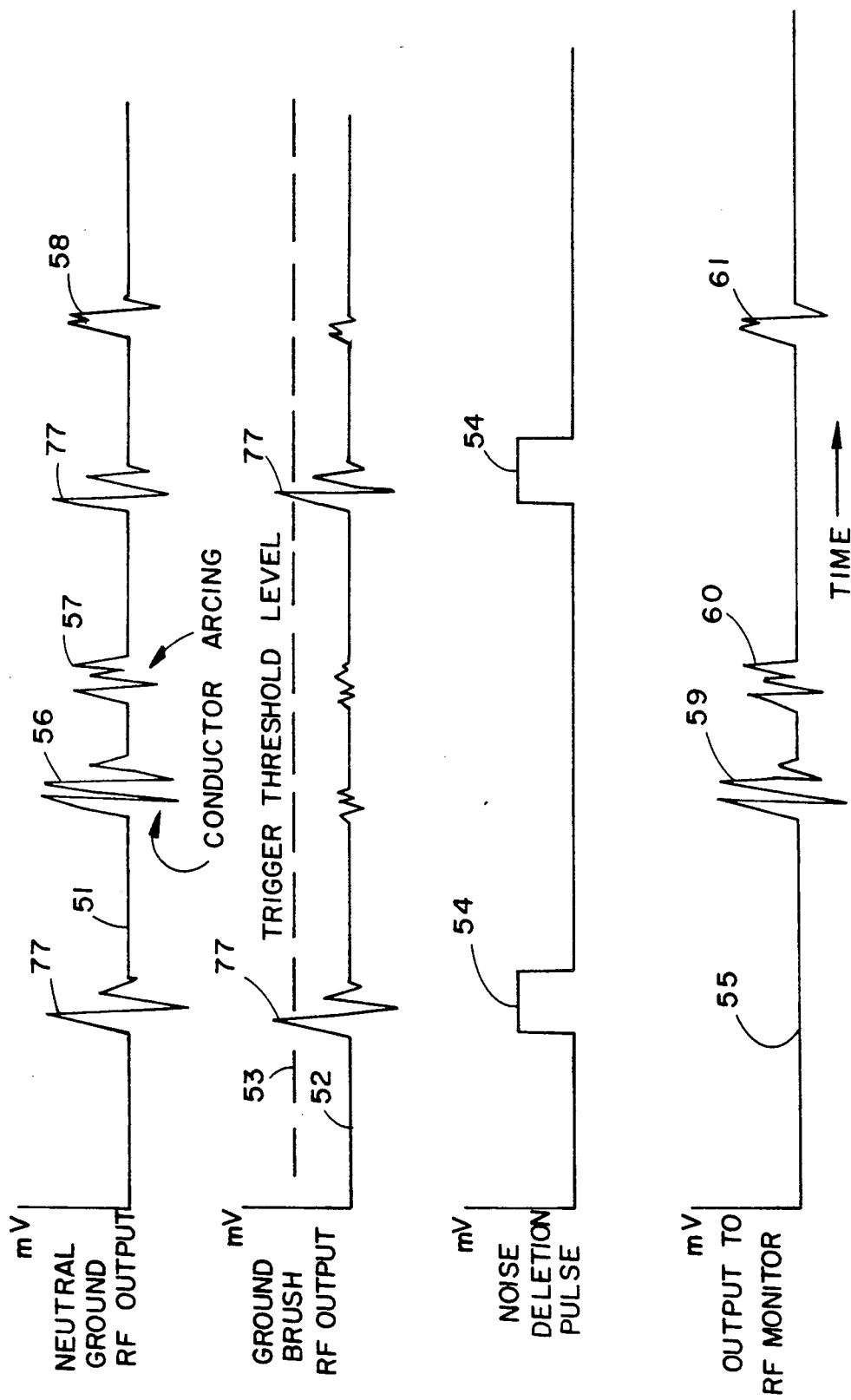
FIG. 6 schematically illustrates the spurious signal deletion sequence in four plots of radio frequency noise intensity or pulse voltage versus time. The top trace is the output from the high frequency current transformer disposed at the neutral ground which shows radio frequency noise from all sources. A trace of radio frequency noise detected by the auxiliary sensor on the shaft grounding brush is shown with two bursts which are coincident with two bursts of noise detected at the neutral ground. The circuit of the embodiment provides a deletion pulse when the shaft ground brush noise exceeds a threshold level shown as a dashed line. The deletion pulse is delivered to the control gate of an analog switch and the output from the analog switch is the lowest trace from which spurious pulses have been deleted.

FIG. 6 illustrates the steps of noise deletion. Various voltages are plotted as functions of time to establish the chronology of spurious RF noise deletion. Plot 51 is the output of the RF current transformer at the common neutral ground lead and contains signals from all sources of RF emanations. In the embodiment of the present invention illustrated in FIG. 6, an auxiliary RF sensor is disposed at the shaft grounding brush and the output is trace 52. When the output of the shaft grounding brush sensor exceeds a threshold trigger level 53, a trigger pulse is sent to the deletion pulse generator, delete pulses 54 are produced and delivered to the gate of the analog switch where the noise from the grounding brush is blocked out of the output from the analog switch as seen in trace 55. Signals of bonafide diagnostic importance, radio frequency noise from, for example, conductor arcing, are present in neutral ground sensor trace as signals 56, 57 and 58 and are transmitted to the radio frequency monitor as noise bursts 59, 60 and 61 for analysis and possible warning initiation.

Figure 7:
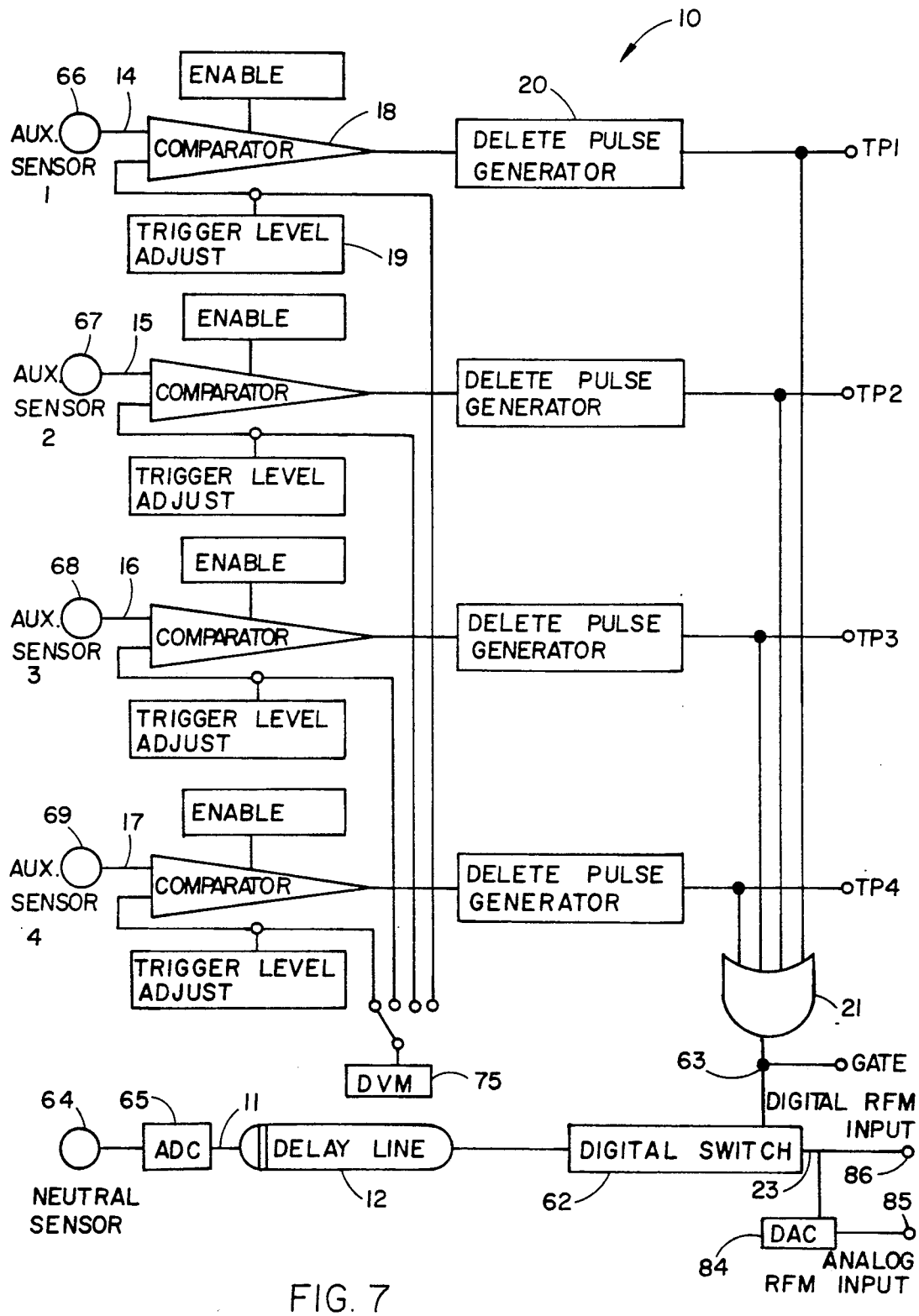
FIG. 7 is a schematic block diagram of an embodiment in which the diagnostic information is digitized having an analog-to-digital converter (ADC) connected to the RF sensor coupled to the neutral ground line. The neutral ground sensor output is converted to a digital signal, subjected to an appropriate delay in a delay line, and delivered to the input of a digital switch. The respective output from each of four auxiliary sensors is compared with a threshold trigger level and passed if larger to a deletion pulse generator with adjustable pulse duration. The output of the deletion pulse generator passes through an OR gate and is delivered to the gate of the digital switch and therein spurious signals are deleted from the RF monitor input. An analog RF monitor is provided a digital-to-analog connector (DAC) 84 at the input 85 whereas a digital RF is directly connected 86 to the output of the digital switch 62.

Referring to FIG. 7, the signal from the neutral ground sensor 64 is converted to a digital signal in the analog-to-digital converter (ADC) 65 and the output is connected 11 to the delay line 12. The delay line output is connected to the input of a digital switch 62 which is controlled by gate control 63 and has output 23 to a digital-to-analog converter (DAC) 84 at the input 85 of a conventional radio frequency monitor which accepts analog signals only. The DAC is omitted from the input 86 of a digital RF monitor. Signals of diagnostic value as well as radio frequency noise due to normal operation are delivered to the digital switch 62. The present invention provides the apparatus and method for deletion of radio frequency signals of no diagnostic value. Auxiliary radio frequency sensors 66–69 are disposed at sources of normal radio frequency noise. The signal from each sensor is delivered to a respective comparator 18 and is compared with a trigger threshold level from a respective trigger level source 19. The output from the comparator 18 initiates a delete pulse of adjustable duration in the delete pulse generator 20. The output of the delete pulse generator and similar outputs from the other delete pulse generators are collected at an OR gate 21 and delivered to the digital switch 62 via gate control 63 thereby deleting spurious RF noise from the input to the R monitor.

Figure 8:
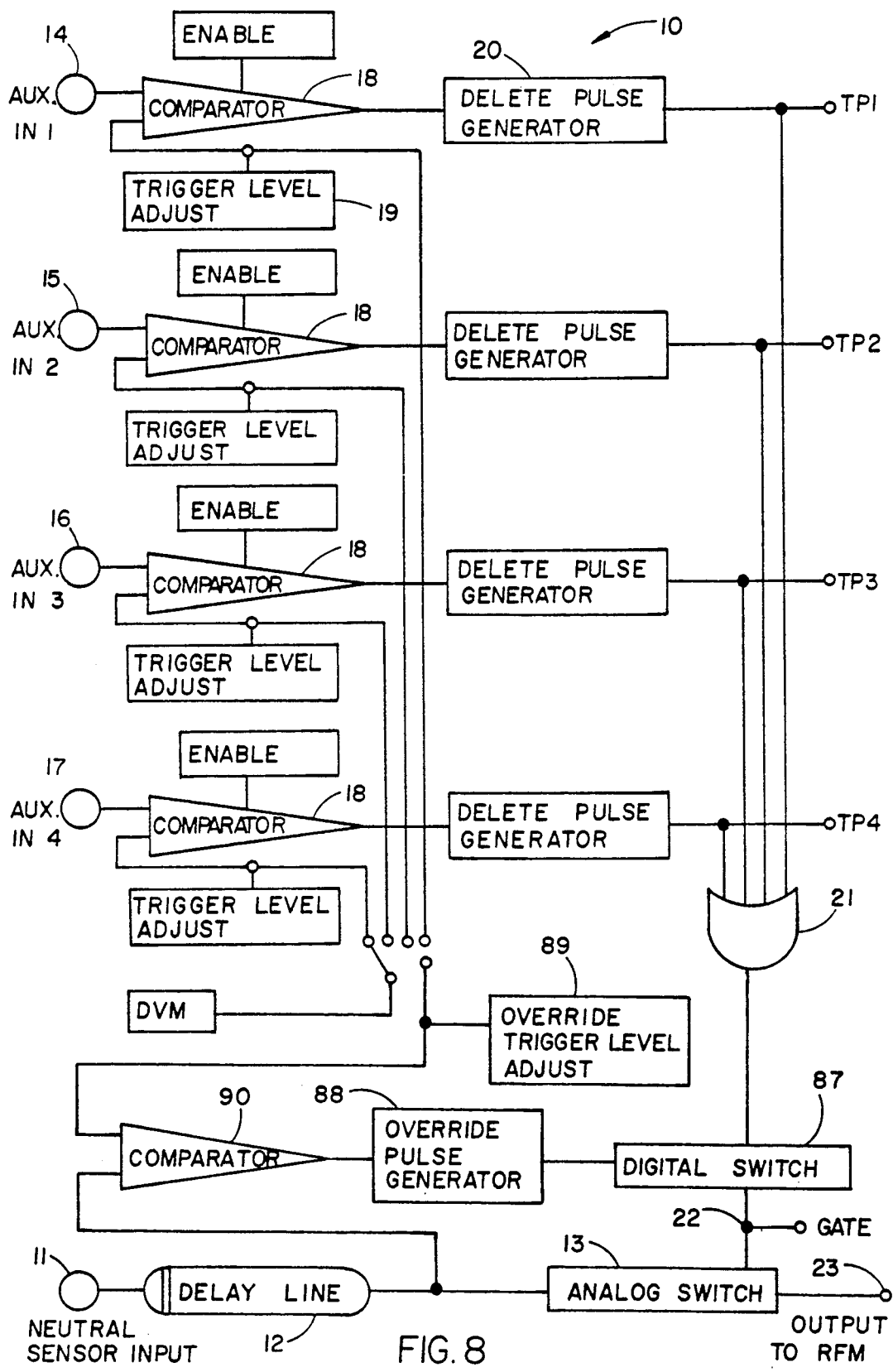
FIG. 8 is a schematic block diagram of an embodiment of the invention showing the neutral ground sensor input to the analog switch through a delay line, and four auxiliary sensor connections wherein each input from four auxiliary sensors is compared with a threshold trigger level and passed if larger to a delete pulse generator which determines the duration of a deletion pulse to the analog switch gate. Further shown is an override circuit which aborts the delete pulse when the neutral ground sensor pulse is higher than a preset level.

Referring to FIG. 8 which shows a block diagram of an embodiment 10 of the present invention in a dynamoelectric machine, output from sensor 11 coupled to the neutral ground is conducted through delay line 12 to the analog switch 13. Signals of diagnostic value as well as RF noise due to normal operation are delivered to the analog switch 13. The present invention provides the apparatus 10 and method for the deletion of RF signals of little diagnostic value. Auxiliary RF sensors are positioned at sources of normal radio frequency noise caused by routine arcing and sparking, and the outputs of four auxiliary sensors 14–17 are shown in FIG. 8. A comparator 18 receives the signal from each auxiliary sensor and transmits it if it is larger than the threshold set by the trigger level adjust 19. The output from the comparator 18 initiates a delete pulse of adjustable duration in the delete pulse generator 20. The delete pulse generator output and similar outputs from the other sources of RF noise are collected at an OR gate 21 and delivered to the gate 22 of the analog switch 13 thereby blocking spurious RF noise from the output 23 which provides the input to the RF monitor. When the pulse from the neutral ground sensor 11 is larger than the threshold set by the override trigger adjust 89, the comparator 90 activates the override pulse generator 88. The output from the override pulse generator is a pulse which opens digital switch 87 thereby overriding the deletion pulse and maintaining the communication between the neutral ground 11 and output 23 to the radio frequency monitor.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A system for detecting, locating and measuring sources of radio frequency (RF) emissions in an electrical apparatus, thereby providing an early warning of impending failure in the apparatus comprising at least two RF sensors disposed on the electrical apparatus at different locations thereon, each of the sensors having a signal output, the strength of which is substantially dependent upon the respective source-to-sensor distance, an adjustable delay line for at least one of the sensors for placing the output signals of the sensors in time coincidence, and comparison means for the time-coincident output signals, strength of said time-coincident output signals are compared against respective references, thereby providing diagnostic information on the occurrence, location or strength of the RF sources, and thereby providing an early warning of impending failure in the apparatus.

2. The system of claim 1, further including a timing and recording means whereby a normal schedule of RF signal strengths may be established, thereby providing reference bases for detecting abnormal operating conditions.

3. The system of claim 1, wherein an adjustable delay line is associated with each sensor.

4. The system of claim 2, wherein a plurality of RF sensors are disposed on the electrical apparatus at different locations thereon, each sensor having a signal output strength substantially dependent upon the respective source-to-sensor distance, a delay line for all but one RF sensor, such that the RF signals can be placed in time coincidence, and a comparison means for the time coincident signals strength of said time-coincident output signals may be compared against respective references, thereby providing diagnostic information on the occurrence, location or strength of the RF sources.

5. The system of claim 1, wherein the electrical apparatus is an electrodynamic machine, an electric power substation or the like.

6. A system for detecting, locating and measuring sources of radio frequency (RF) emissions in an electrical apparatus, thereby providing an early warning of impending failure in the apparatus, comprising at least two RF sensors, each sensor having a signal output strength substantially dependent on the source-to-sensor distance, each sensor disposed on the electrical apparatus at different locations, an RF monitor, the RF monitor having an input, a switching means, the switching means having an output connected to the RF monitor input, and further having a control gate and an input, a delay line, one of the sensors comprising a diagnostic sensor having its output connected through the delay line to the input of the switching means, the other sensors being disposed at locations of normal RF noise, means for converting other sensor signals of minimum strength into acceptable gate pulses which arrive at the switching means gate in coincidence with the diagnostic sensor signal, open the switch, interrupt the diagnostic sensor communication with the RF monitor and thereby delete false RF warnings and improve the reliability of RF monitoring for diagnostic purposes.

7. A system for sensing diagnostic radio frequency (RF) signals from a dynamoelectric machine having isolated phase power buses and a neutral ground connection, and the machine further having a rotating shaft carrying slip rings and a grounding brush, wherein means are provided for detecting and deleting spurious RF signals, and wherein a product signal is delivered to a RF monitor, comprising a first RF sensor coupled to the neutral ground connection and having an output, a delay line connected to the output of the sensor, an analog switch connected to the output of the delay line, the analog switch having a gate control and further having an output connected to the RF monitor, an analog switch control gate connection for the interruption of the signal to the RF monitor, at least one additional RF sensor positioned at a source of spurious RF emanations associated with at least one of the slip rings, shaft grounding brush, and isolated phase power buses, respectively, trigger level adjustment means for said at least one additional sensor, means for comparing the signal from the additional sensor with the adjusted trigger level, thereby providing an acceptable trigger signal, a deletion pulse generator having an input connected to the trigger source and further having a means of generating a deletion pulse of adjustable duration and an output, an OR gate, and connection means for passing a deletion pulse through the OR gate to the analog switch control gate, whereby the signal to the RF monitor is interrupted when spurious radio frequency activity is detected by at least one additional sensor.

8. The system of claim 7, wherein the dynamoelectric machine is an electric power generator.

9. The system of claim 7, wherein the dynamoelectric machine is an electric motor.

10. The system of claim 7, wherein the sensors for radio frequency emanations are high frequency current transformers, capacitors or antennas.

11. The system of claim 7, further including a spurious radiation sensor, the sensor being portable and flexibly connected to the analog switch, so that the spurious radiation sensor may be positioned at various radio frequency sources to assess their strengths.

12. A system for sensing diagnostic radio frequency (RF) signals from a dynamoelectric machine having isolated phase power buses and a neutral ground connection, and the machine further having a rotating shaft carrying slip rings and a grounding brush, wherein means are provided for detecting and deleting spurious RF signals, and wherein a product signal is delivered to an analog RF monitor, comprising a first RF sensor coupled to the neutral ground connection, an analog-to-digital converter (ADC) having an input connected to the RF sensor output, a delay line connected to the output of the ADC, a digital switch connected to the output of the delay line, the digital switch having a gate control and further having an output, a digital-to-analog converter (DAC) having an input connected to the output of the digital switch and an output connected to the analog RF monitor input, a digital switch control gate connection for the interruption of the signal to the RF monitor, at least one additional RF sensor positioned at a source of spurious RF emanations associated with at least one of the slip rings, shaft grounding brush, and isolated phase power buses, respectively, trigger level adjustment means for said at least one additional sensor, means for comparing the signal from the additional sensor with the adjusted trigger level, thereby providing an acceptable trigger signal, a deletion pulse generator having an input connected to the trigger source and further having a means of generating a deletion pulse of adjustable duration and an output, an OR gate, and connection means for passing a deletion pulse through the OR gate to the digital switch control gate, whereby the signal to the RF monitor is interrupted when spurious radio frequency activity is detected by at least one additional sensor.

13. The system of claim 12, wherein the dynamoelectric machine is an electric power generator.

14. The system of claim 12, wherein the dynamoelectric machine is an electric motor.

15. The system of claim 12, wherein the sensors for radio frequency emanations are high frequency current transformers, capacitors or antennas.

16. The system of claim 12, further including a spurious radiation sensor, the sensor being portable and flexibly connected to the digital switch, so that the spurious radiation sensor may be positioned at various radio frequency sources to assess their strengths and to provide an interrupt signal to the digital switch for spurious radiations from a normal source.

17. A system for sensing diagnostic radio frequency (RF) signals from a dynamoelectric machine having isolated phase power buses and a neutral ground connection, and the machine further having a rotating shaft carrying slip rings and a grounding brush, wherein means are provided for detecting and deleting spurious RF signals, and wherein a product signal is delivered to a digital RF monitor, comprising a first RF sensor coupled to the neutral ground connection, an analog-to-digital converter (ADC) having an input connected to the output of the RF sensor, a delay line connected to the output of the ADC, a digital switch connected to the output of the delay line, the digital switch having a gate control and further having an output connected to the input of the RF monitor, a digital switch control gate connection for the interruption of the signal to the RF monitor, at least one additional RF sensor positioned at a source of spurious RF emanations associated with at least one of the slip rings, shaft grounding brush, and isolated phase power buses, respectively, trigger level adjustment means for said at least one additional sensor, means for comparing the signal from the additional sensor with the adjusted trigger level, thereby providing an acceptable trigger signal, a deletion pulse generator having an input connected to the trigger source and further having a means of generating a deletion pulse of adjustable duration and an output, an OR gate, and connection means for passing a deletion pulse through the OR gate to the digital switch control gate, whereby the signal to the RF monitor is interrupted when spurious radio frequency activity is detected by at least one additional sensor.

18. The system of claim 17, wherein the dynamoelectric machine is an electric power generator.

19. The system of claim 17, wherein the dynamoelectric machine is an electric motor.

20. The system of claim 17, wherein the sensors for radio frequency emanations are high frequency current transformers, capacitors or antennas.

21. The system of claim 17, further including a spurious radiation sensor, the sensor being portable and flexibly connected to the digital switch, so that the spurious radiation sensor may be positioned at various radio frequency sources to assess their strengths and to provide an interrupt signal to the digital switch for spurious radiation from a normal source.

22. A system for detecting and locating sources of radio frequency (RF) emissions in an electrical apparatus thereby providing an early warning of impending failure in the apparatus, comprising at least two sensors disposed at different locations on the apparatus, said sensors having a signal output strength which substantially increases as the source-to-sensor distance decreases, an analog-to-digital converter (ADC) connected to the output of each sensor, an analog RF monitor, a digital-to-analog converter (DAC) connected to the input of the RF monitor, a digital switch having an output connected to the DAC input further having a gate and an input, a delay line for each sensor, one of the sensors comprising a diagnostic sensor by having its output connected through the respective delay line to the digital switch input wherein signals from the other sensor(s) disposed at noise sources open the switch in time coincidence with the diagnostic sensor thereby deleting the signal from the diagnostic sensor for the duration of the pulse, and thereby increasing the value of RF monitoring for diagnostic purposes.

23. A system for detecting and locating sources of radio frequency (RF) emissions in an electrical apparatus thereby providing an early warning of impending failure in the apparatus, comprising at least two sensors disposed at different locations on the apparatus, said sensors having a signal output strength which substantially increases as the source-to-sensor distance decreases, an analog-to-digital converter (ADC) connected to the output of each sensor, a digital RF monitor, a digital switch having an output connected to the RF monitor input further having a gate and an input, a delay line for each sensor, one of the sensors comprising a diagnostic sensor by having its output connected to the respective delay line input, said delay line output having a connection to the digital switch input wherein signals from the other sensor(s) disposed at noise sources open the switch in time coincidence with the diagnostic sensor thereby deleting the signal from the diagnostic sensor for the duration of the pulse, and thereby increasing the value of RF monitoring for diagnostic purposes.

24. A system for detecting and locating sources of radio frequency (RF) emissions in a dynamoelectric machine, comprising at least two sensors disposed at different locations on the machine, an analog-to-digital converter (ADC) connected to the output of each sensor, a delay line for each sensor, the output of the ADC connected to the input of the delay line, a digital means of comparing the time coincident signal strengths with respective references, a digital means of recording signal strength variations as functions of time, thereby providing an early warning of impending machine failure and increasing the value of radio frequency monitoring for diagnostic purposes.

25. A method for sensing diagnostic RF signals from a dynamoelectric machine and for precluding spurious RF signals that may trigger a false alarm, the machine having a neutral ground connection, comprising the steps of detecting RF signals at the neutral ground connection of the machine, providing a delay line for receiving the RF signals at the neutral ground connection, providing an analog switch for receiving the RF signals from the delay line, the analog switch having a control gate and further having an output, providing an analog RF monitor, connecting the output of the analog switch to the RF monitor, detecting spurious RF signals at at least one auxiliary location on the machine other than the neutral ground connection, providing a comparator having two inputs and one output, comparing the spurious RF signals with a predetermined standard to assure recognition as a noise signal, providing a deletion pulse generator having an input connected to the output of the comparator, a means of producing a deletion pulse of predetermined duration at the output and a connection of the output to the gate of the analog switch, passing the deletion pulse to the control gate of the analog switch, thereby deleting noise signals from the neutral ground sensor when at least one auxiliary sensor signal opens the switch, thereby precluding false warning signals to the radio frequency monitor, and significantly increasing the reliability of the radio frequency monitor as a warning device.

26. The method of claim 25, further detecting spurious signals at a plurality of locations on the machine or in the environment thereof.

27. The method of claim 25, further providing an OR gate to the analog switch when more than one auxiliary sensor is disposed, and passing the deletion pulses to the OR gate and thence to the analog switch.

28. The method of claim 25, further providing sensors such as high frequency current transformers, capacitors and antenna for radio frequency sensing and detecting RF emanations therewith.

29. The method of claim 25, and the further steps of providing a portable radio frequency sensor having flexible connections with the analog switch, positioning the sensor at a location on the machine, measuring RF emanations from the location and interrupting the signal from the neutral ground sensor where spurious radiation from a normal source is detected.

30. A method for sensing diagnostic RF signals from a dynamoelectric machine and for precluding spurious RF signals that may trigger a false alarm, the machine having a neutral ground connection, comprising the steps of detecting RF signals at the neutral ground connection of the machine, providing an analog-to-digital converter (ADC) for receiving the RF signals at the neutral ground connection, providing a delay line for receiving the signals from the ADC, providing a digital switch for receiving the RF signals from the delay line, the digital switch having a control gate and further having an output, providing an analog RF monitor, providing a digital-to-analog converter (DAC) connected to the input of the RF monitor, connecting the output of the digital switch to the DAC, detecting spurious RF signals at at least one auxiliary location on the machine other than the neutral ground connection, providing a comparator having two inputs and one output, comparing the spurious RF signals with a predetermined standard to assure recognition as a noise signal, providing a deletion pulse generator having an input connected to the output of the comparator, a means of producing a deletion pulse of predetermined duration at the output and a connection of the output to the gate of the digital switch, passing the deletion pulse to the control gate of the digital switch, thereby deleting noise signals from the neutral ground sensor when at least one auxiliary sensor signal open the switch, thereby precluding false warning signals to the radio frequency monitor, and significantly increasing the reliability of the radio frequency monitor as a warning device.

31. The method of claim 30, further detecting spurious signals at a plurality of locations on the machine or in the environment thereof.

32. The method of claim 30, further providing an OR gate to the digital switch when more than one auxiliary sensor is disposed, and passing the deletion pulses to the OR gate and thence to the digital switch.

33. The method of claim 30, further providing sensors such as high frequency current transformers, capacitors and antenna for radio frequency sensing and detecting RF emanations therewith.

34. The method of claim 30, and the further steps of providing a portable radio frequency sensor having flexible connections with the digital switch, positioning the sensor at a location on the machine and measuring RF emanations from the location and interrupting the signal from the neutral ground sensor when spurious radiation from a normal source is detected.

35. A method for sensing diagnostic RF signals from a dynamoelectric machine and for precluding spurious RF signals that may trigger a false alarm, the machine having a neutral ground connection, comprising the steps of detecting RF signals at the neutral ground connection of the machine, providing an analog-to-digital converter (ADC) for receiving the RF signals at the neutral ground connection, providing a delay line for receiving the signals from the ADC, providing a digital switch for receiving the RF signals from the delay line, the digital switch having a control gate and further having an output, providing a digital RF monitor, connecting the output of the digital switch to the RF monitor, detecting spurious RF signals at at least one auxiliary location on the machine other than the neutral ground connection, providing a comparator having two inputs and one output, comparing the spurious RF signals with a predetermined standard to assure recognition as a noise signal, providing a deletion pulse generator having an input connected to the output of the comparator, a means of producing a deletion pulse of predetermined duration at the output and a connection of the output to the gate of the digital switch, passing the deletion pulse to the control gate of the digital switch, thereby deleting noise signals from the neutral ground sensor when at least one auxiliary sensor signal open the switch, thereby precluding false warning signals to the radio frequency monitor, and significantly increasing the reliability of the radio frequency monitor as a warning device.

36. The method of claim 35, further detecting spurious signals at a plurality of locations on the machine or in the environment thereof.

37. The method of claim 35, further providing an OR gate to the digital switch when more than one auxiliary sensor is disposed, and passing the deletion pulses to the OR gate and thence to the digital switch.

38. The method of claim 35, further providing sensors such as high frequency current transformers, capacitors and antenna for radio frequency sensing and detecting RF emanations therewith.

39. The method of claim 35, and the further steps of providing a portable radio frequency sensor having flexible connections with the digital switch, positioning the sensor at a location on the machine and measuring RF emanations from the location and interrupting the signal from the neutral ground sensor when spurious radiation from a normal source is detected.

40. In a radio frequency (RF) monitoring system for a dynamoelectric machine having a common neutral ground, wherein a first RF sensor, having an output, is coupled to the common neutral ground of the machine, wherein a delay line, having an input is connected to the output of the first RF sensor, and wherein an RF monitor, having an input, is connected to the output of the delay line, thereby detecting an impending failure of the machine, the improvement comprising at least a second RF sensor having an output and being disposed on the machine or in the vicinity thereof to detect spurious RF signals that may otherwise interfere with the radio frequency monitoring system, comparison means for comparing the output of the second RF sensor against a predetermined threshold value, and means responsive to the comparison means and connected to the input of the RF monitor for deleting the spurious signals from the RF monitor, thereby substantially improving the utility of the radio frequency monitoring system.

41. The improvement of claim 40, wherein the means responsive to the comparison means comprises an analog switch; the analog switch having an input connection to the output of the delay line, an output connected to the input of the RF monitor, a gate, and a connection between said gate and the sensor comparison means whereby the second sensor produces a trigger signal, a deletion pulse generator, having an input, an output and means of pulse duration adjustment is connected to the output of the comparison means and the deletion pulse generator output is connected to the gate of the analog switch wherein a deletion pulse opens the analog switch deleting normal RF noise for a predetermined interval of time thereby substantially increasing the diagnostic significance of radio frequency monitoring.

42. The improvement of claim 41, wherein a plurality of sensors in addition to the diagnostic first sensor at the common neutral ground are disposed at known sources of normal radio frequency noise, each sensor having an output, a comparator to pass said output if above a predetermined level, a deletion pulse generator receiving the comparator output, a means of adjusting the duration of the deletion pulse and a connection delivering the generated deletion pulse through an OR gate to the analog switch control gate whereby the pulse from each normal noise sensor deletes the normal noise from the input to the RF monitor and thereby improving the reliability and efficiency of radio frequency monitoring for diagnostic purposes.

43. The improvement of claim 42, wherein the plurality of sensors in addition to the diagnostic primary sensor coupled to the common neutral ground are disposed at slip rings for d.c. windings, the shaft grounding brush, the isolated phase bus shielding and mount grounds, and at other sources.

44. The improvement of claim 42, wherein one of the auxiliary sensors, its respective comparator and its respective deletion pulse generator are portable having flexible means of connection to the analog switch for convenient and swift deployment to a suspected or temporary spurious source of radio frequency noise thereby providing a prompt assessment of the importance of the real or suspected spurious sources.

45. The improvement of claim 42, wherein at least one of radio frequency sensors is a high frequency current transformer.

46. The improvement of claim 42, wherein at least one of the radio frequency sensors is a capacitor.

47. The improvement of claim 42, wherein at least one radio frequency sensor is a radio frequency antenna.

48. In a radio frequency (RF) monitoring system for a dynamoelectric machine having a common neutral ground, wherein a first RF sensor, having an output, is coupled to the common neutral ground of the machine, wherein an analog-to-digital converter (ADC), having an input is connected to the output of the first RF sensor, wherein a delay line, having an input, is connected to the output of the ADC, and wherein a digital-to-analog converter (DAC) having an input, is connected to the output of the delay line, and wherein an analog RF monitor is connected to the output of the DAC, thereby detecting an impending failure of the machine, the improvement comprising at least a second RF sensor having an output and being disposed on the machine or in the vicinity thereof to detect spurious RF signals that may otherwise interfere with the radio frequency monitoring system, comparison means for comparing the output of the second RF sensor against a predetermined threshold value, and means responsive to the comparison means and connected to the input of the RF monitor for deleting the spurious signals from the RF monitor, thereby substantially improving the utility of the radio frequency monitoring system.

49. The improvement of claim 48, wherein the means responsive to the comparison means comprises an digital switch; the digital switch having an input connection to the output of the delay line, an output connected to the input of the DAC, a gate, and a connection between said gate and the sensor comparison means whereby the second sensor produces a trigger signal, a deletion pulse generator, having an input, an output and means of pulse duration adjustment, is connected to the output of the comparison means and the deletion pulse generator output is connected to the gate of the digital switch wherein a deletion pulse opens the analog switch deleting normal RF noise for a predetermined interval of time thereby substantially increasing the diagnostic significance of radio frequency monitoring.

50. The improvement of claim 49, wherein a plurality of sensors in addition to the diagnostic first sensor at the common neutral ground are disposed at known sources of normal radio frequency noise, each sensor having an output, a comparator to pass said output if above a predetermined level, a deletion pulse generator receiving the comparator output, a means of adjusting the duration of the deletion pulse and a connection delivering the generated deletion pulse through an OR gate to the digital switch control gate whereby the pulse from each normal noise sensor deletes the normal noise from the input to the RF monitor and thereby improving the reliability and efficiency of radio frequency monitoring for diagnostic purposes.

51. The improvement of claim 50, wherein the plurality of sensors in addition to the diagnostic primary sensor coupled to the common neutral ground are disposed at slip rings for d.c. windings, the shaft grounding brush, the isolated phase bus shielding and mount grounds, and at other sources.

52. The improvement of claim 50, wherein one of the auxiliary sensors, its respective comparator and its respective deletion pulse generator are portable having flexible means of connection to the digital switch for convenient and swift deployment to a suspected or temporary spurious source of radio frequency noise thereby providing a prompt assessment of the importance of the real or suspected spurious sources.

53. The improvement of claim 50, wherein at least one of radio frequency sensors is a high frequency current transformer.

54. The improvement of claim 50, wherein at least one of the radio frequency sensors is a capacitor.

55. The improvement of claim 50, wherein at least one radio frequency sensor is a radio frequency antenna.

56. In a radio frequency (RF) monitoring system for a dynamoelectric machine having a common neutral ground, wherein a first RF sensor, having an output, is coupled to the common neutral ground of the machine, wherein an analog-to-digital converter (ADC), having an input is connected to the output of the first RF sensor, a delay line, having an input, is connected to the output of the ADC, and wherein a digital RF monitor, having an input, is connected to the output of the delay line, thereby detecting an impending failure of the machine, the improvement comprising at least a second RF sensor having an output and being disposed on the machine or in the vicinity thereof to detect spurious RF signals that may otherwise interfere with the radio frequency monitoring system, comparison means for comparing the output of the second RF sensor against a predetermined threshold value, and means responsive to the comparison means and connected to the input of the RF monitor for deleting the spurious signals from the RF monitor, thereby substantially improving the utility of the radio frequency monitoring system.

57. The improvement of claim 56, wherein the means responsive to the comparison means comprises a digital switch; the digital switch having an input connection to the output of the delay line, an output connected to the input of the digital RF monitor, a gate, and a connection between said gate and the sensor comparison means whereby the second sensor produces a trigger signal, a deletion pulse generator, having an input, an output and means of pulse duration adjustment, is connected to the output of the comparison means and the deletion pulse generator output is connected to the gate of the digital switch wherein a deletion pulse opens the analog switch deleting normal RF noise for a predetermined interval of time thereby substantially increasing the diagnostic significance of radio frequency monitoring.

58. The improvement of claim 57, wherein a plurality of sensors in addition to the diagnostic first sensor at the common neutral ground are disposed at known sources of normal radio frequency noise, each sensor having an output, a comparator to pass said output if above a predetermined level, a deletion pulse generator receiving the comparator output, a means of adjusting the duration of the deletion pulse and a connection delivering the generated deletion pulse through an OR gate to the digital switch control gate whereby the pulse from each normal noise sensor deletes the normal noise from the input to the RF monitor and thereby improving the reliability and efficiency of radio frequency monitoring for diagnostic purposes.

59. The improvement of claim 58, wherein the plurality of sensors in addition to the diagnostic primary sensor coupled to the common neutral ground are disposed at slip rings for d.c. windings, the shaft grounding brush, the isolated phase bus shielding and mount grounds, and at other sources.

60. The improvement of claim 58, wherein one of the auxiliary sensors, its respective comparator and its respective deletion pulse generator are portable having flexible means of connection to the digital switch for convenient and swift deployment to a suspected or temporary spurious source of radio frequency noise thereby providing a prompt assessment of the importance of the real or suspected spurious sources.

61. The improvement of claim 58, wherein at least one of radio frequency sensors is a high frequency current transformer.

62. The improvement of claim 58, wherein at least one of the radio frequency sensors is a capacitor.

63. The improvement of claim 58, wherein at least one radio frequency sensor is a radio frequency antenna.

64. A system for detecting, locating and measuring sources of radio frequency (RF) emissions in an electrical apparatus, thereby providing an early warning of impending failure in the apparatus, comprising at least two RF sensors and including a first sensor and a second sensor disposed on the electrical apparatus at different locations thereon, each of the first and second sensors having a signal output, the signals normally being out of time coincidence, and the signal from the first sensor being ahead of the signal from the second sensor, the strength of the signals being substantially dependent upon the respective source-to-sensor distance, means for placing the signals of the first and second in substantial time coincidence, comparison means for the substantially time-coincident signals, and a reference signal for each sensor whereby the substantially time coincident sensor signals may be compared against the respective reference signals thereby providing diagnostic information on the occurrence, location or strength of the RF sources, and thereby providing an early warning of impending failure in the apparatus.

65. The system of claim 64, wherein the means for placing the signals of the first and second sensors in substantial time coincidence comparison is a means for delaying the early signal from the first sensor.

66. The system of claim 65, wherein the means for delaying the signal from the first sensor comprises a delay line.

67. The system of claim 66, wherein the delay line is adjustable.

* * * * *